(12) United States Patent
Li et al.

(10) Patent No.: US 12,507,314 B2
(45) Date of Patent: Dec. 23, 2025

(54) DISCONTINUOUS RECEPTION DRX CONFIGURATION METHOD, APPARATUS, AND EQUIPMENT

(71) Applicant: VIVO MOBILE COMMUNICATION CO., LTD., Dongguan (CN)

(72) Inventors: Dongru Li, Dongguan (CN); Chaojun Zeng, Dongguan (CN); Xiaodong Sun, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 448 days.

(21) Appl. No.: 18/110,866

(22) Filed: Feb. 16, 2023

(65) Prior Publication Data

US 2023/0199906 A1    Jun. 22, 2023

Related U.S. Application Data

(63) Continuation of application No. PCT/CN2021/113690, filed on Aug. 20, 2021.

(30) Foreign Application Priority Data

Aug. 20, 2020    (CN) .......................... 202010845314.7

(51) Int. Cl.
*H04W 76/28* (2018.01)
*H04W 72/12* (2023.01)
*H04W 72/23* (2023.01)

(52) U.S. Cl.
CPC ........... *H04W 76/28* (2018.02); *H04W 72/12* (2013.01); *H04W 72/23* (2023.01)

(58) Field of Classification Search
CPC ..... H04W 76/28; H04W 72/12; H04W 72/23; H04W 72/232; H04W 24/02; Y02D 30/70; H04L 5/0053
See application file for complete search history.

(56) References Cited

U.S. PATENT DOCUMENTS

2012/0014306 A1    1/2012  Pelletier et al.
2016/0128084 A1*   5/2016  Novlan ............. H04W 72/1268
                                                        370/329

(Continued)

FOREIGN PATENT DOCUMENTS

CN      102210109 A    10/2011
CN      102273250 A    12/2011

(Continued)

OTHER PUBLICATIONS

First Office Action issued in related Chinese Application No. 202010845314.7, mailed Mar. 30, 2023, 9 pages.

(Continued)

*Primary Examiner* — Afshawn M Towfighi
(74) *Attorney, Agent, or Firm* — IPX PLLC

(57) ABSTRACT

A discontinuous reception (DRX) configuration method, apparatus, and equipment are provided. The method includes: obtaining DRX start offset information by a first method; and determining a target DRX start offset based on the DRX start offset information. The first method includes at least one of the following: receiving first downlink control information (DCI), where the first DCI carries the DRX start offset information; configuring the DRX start offset information by a network side device or stipulating the DRX start offset information in a protocol; or obtaining first information, where the first information carries the DRX start offset information.

18 Claims, 6 Drawing Sheets

(56) References Cited

U.S. PATENT DOCUMENTS

| | | | |
|---|---|---|---|
| 2018/0042068 A1 | 2/2018 | Sebire et al. | |
| 2018/0183485 A1* | 6/2018 | Bontu | H04B 1/44 |
| 2018/0206290 A1* | 7/2018 | Dai | H04W 52/50 |
| 2020/0229093 A1* | 7/2020 | Ahmad | H04W 72/23 |

FOREIGN PATENT DOCUMENTS

| | | | | |
|---|---|---|---|---|
| CN | 102595573 A | 7/2012 | | |
| CN | 104219738 A | 12/2014 | | |
| CN | 107409330 A | 11/2017 | | |
| CN | 110913462 A | 3/2020 | | |
| CN | 111096026 A | 5/2020 | | |
| CN | 111510997 A | 8/2020 | | |
| CN | 111556590 A | 8/2020 | | |
| EP | 2182769 A2 * | 5/2010 | | H04W 76/28 |
| WO | 2020145611 A1 | 7/2020 | | |

OTHER PUBLICATIONS

Second Office Action issued in related Chinese Application No. 202010845314.7, mailed Aug. 30, 2023, 7 pages.
Extended European Search Report issued in related European Application No. 21857752.6, mailed Jan. 26, 2024, 7 pages.
International Search Report issued in corresponding International Application No. PCT/CN2021/113690, mailed Nov. 19, 2021, 5 pages.

* cited by examiner

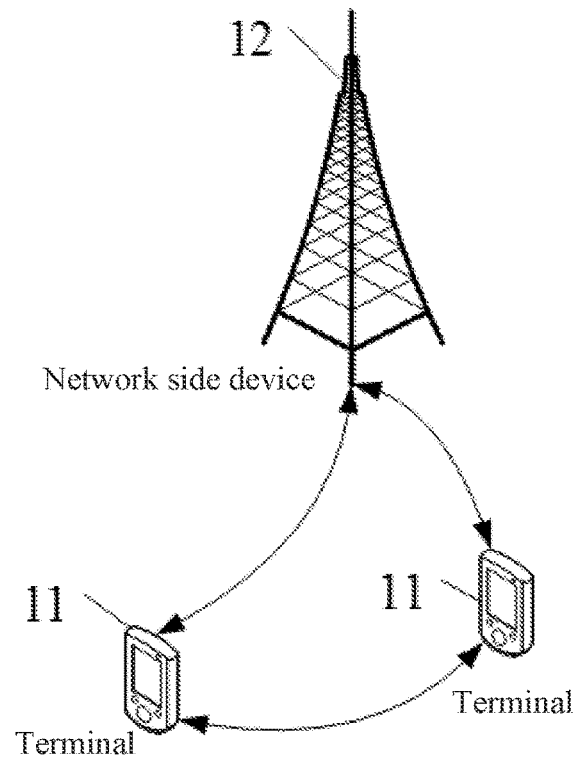

FIG. 1

Obtain DRX start offset information by a first method, where the first method includes at least one of the following: receiving first downlink control information DCI, where the first DCI carries the DRX start offset information; configuring the DRX start offset information by a network side device or stipulating the DRX start offset information in a protocol; and obtaining first information, where the first information carries the DRX start offset information. — 201

Determine a target DRX start offset based on the DRX start offset information. — 203

FIG. 2

Provide, by a first method, DRX start offset information for a terminal device, where the DRX start offset information is used to determine a target DRX start offset. The first method includes at least one of the following: sending first downlink control information DCI, where the first DCI carries the DRX start offset information; configuring the DRX start offset information; and sending first information, where the first information carries the DRX start offset information. ~ 301

FIG. 5

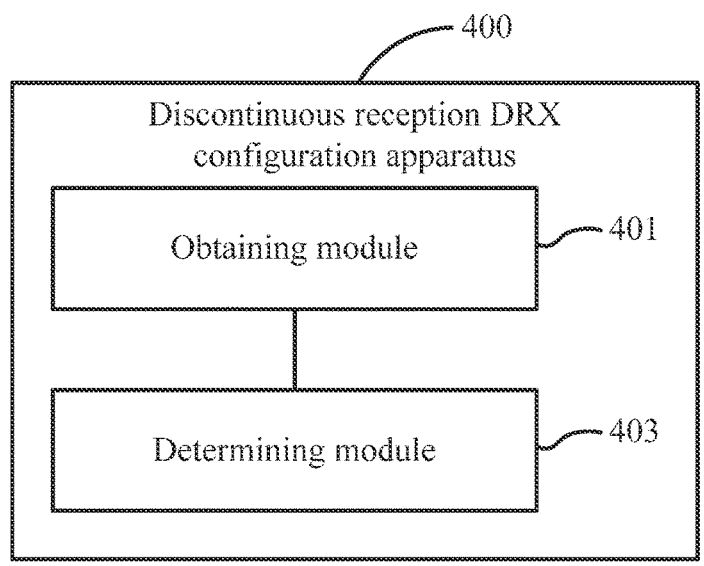

FIG. 6

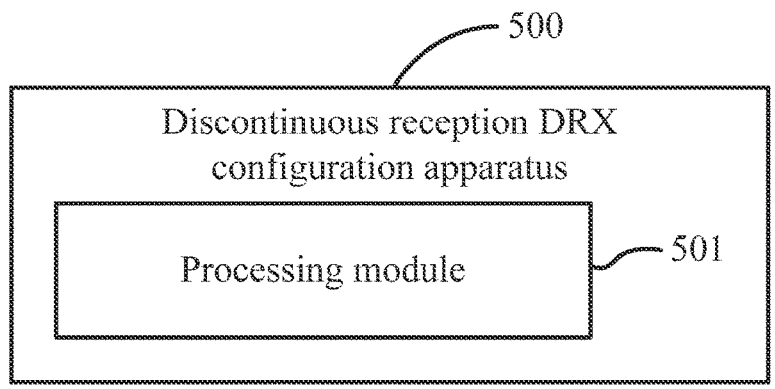

DISCONTINUOUS RECEPTION DRX CONFIGURATION METHOD, APPARATUS, AND EQUIPMENT

CROSS-REFERENCE TO RELATED APPLICATIONS

This application is a continuation of International Application No. PCT/CN2021/113690, filed Aug. 20, 2021, which claims priority to Chinese Patent Application No. 202010845314.7, filed Aug. 20, 2020. The entire contents of each of the above-referenced applications are expressly incorporated herein by reference.

TECHNICAL FIELD

This application relates to the communications field, and in particular, to a discontinuous reception DRX configuration method, apparatus, and equipment.

BACKGROUND

Extended Reality (XR) refers to all real-and-virtual combined environments and human-computer interactions generated by using a computer and a wearable device, including representative forms such as Augmented Reality (AR), Mixed Reality (MR), and Virtual Reality (VR), and interpolation areas between them.

In an XR service model, a service packet arrives at equal intervals, and an interval is a small floating point number. In addition, an XR service has a high requirement for time delay, and air interface transmission Packet Delay Budget (PDB) is about 10 ms. Therefore, according to the characteristics of the XR service, to save energy and power, a smaller Discontinuous Reception (DRX) cycle needs to be configured, to meet the requirement. However, in a case that a DRX cycle is small, the packet loss rate may be increased, and information transmission may fail.

SUMMARY

This application provides a discontinuous reception DRX configuration method, apparatus, and equipment.

According to a first aspect, a discontinuous reception DRX configuration method is provided. The method is performed by a terminal device and includes: obtaining DRX start offset information by a first method; and determining a target DRX start offset based on the DRX start offset information. The first method includes at least one of the following: receiving first downlink control information DCI, where the first DCI carries the DRX start offset information; configuring the DRX start offset information by a network side device or stipulating the DRX start offset information in a protocol; or obtaining first information, where the first information carries the DRX start offset information.

According to a second aspect, a discontinuous reception DRX configuration apparatus is provided. The apparatus is applied to a terminal device and includes: an obtaining module, configured to obtain DRX start offset information by a first method, and a determining module, configured to determine a target DRX start offset based on the DRX start offset information. The first method includes at least one of the following: receiving first downlink control information DCI, where the first DCI carries the DRX start offset information; configuring the DRX start offset information by a network side device or stipulating the DRX start offset information in a protocol; or obtaining first information, where the first information carries the DRX start offset information.

According to a third aspect, a terminal device is provided. The terminal device includes a memory, a processor, and a program or an instruction stored in the memory and executable on the processor. When the program or the instruction is executed by the processor, steps of the method according to the first aspect are implemented.

According to a fourth aspect, a discontinuous reception DRX configuration method is provided. The method is performed by a network side device and includes: providing, by a first method, DRX start offset information for a terminal device, where the DRX start offset information is used to determine a target DRX start offset. The first method includes at least one of the following: sending first downlink control information DCI, where the first DCI carries the DRX start offset information; configuring the DRX start offset information; or sending first information, where the first information carries the DRX start offset information.

According to a fifth aspect, a discontinuous reception DRX configuration apparatus is provided. The apparatus is applied to a network side device and includes a processing module, configured to provide, by a first method, DRX start offset information for a terminal device, where the DRX start offset information is used to determine a target DRX start offset. The first method includes at least one of the following: sending first downlink control information DCI, where the first DCI carries the DRX start offset information; configuring the DRX start offset information; or sending first information, where the first information carries the DRX start offset information.

According to a sixth aspect, a network side device is provided, including a memory, a processor, and a program or an instruction that is stored in the memory and that can be run on the processor. When the program or the instruction is executed by the processor, steps of the method according to the fourth aspect are implemented.

According to a seventh aspect, a readable storage medium is provided. The readable storage medium stores a program or an instruction. When the program or the instruction is executed by the processor, steps of the method according to the first aspect or steps of the method according to the fourth aspect are implemented.

According to an eighth aspect, a computer program product is provided. The computer program product includes a processor, a memory, and a program or an instruction stored in the memory and capable of running on the processor. When the program or the instruction is executed by the processor, steps of the method according to the first aspect or steps of the method according to the fourth aspect are implemented.

According to a ninth aspect, a chip is provided. The chip includes a processor and a communications interface. The communications interface is coupled to the processor, and the processor is configured to run a program or an instruction of a terminal device or a network side device, to implement steps of the method according to the first aspect or implement steps of the method according to the fourth aspect.

In this embodiment of this application, the DRX start offset information for determining the target DRX start offset may be obtained by different methods. The DRX start offset information may be obtained by an explicit indication of the first DCI, that is, the DRX start offset information is carried in the first DCI, to adjust the DRX start offset based on the explicit triggering of the DCI. In another aspect, the DRX start offset information may be obtained based on the configuration of the network side device or the stipulation in the protocol. In still another aspect, the DRX start offset information may also be obtained by implicit or semi-implicit indication of the first information, that is, the DRX start offset information is carried in the first information, to adjust the DRX start offset based on implicit or semi-implicit triggering of the first information. In this way, DRX configurations conforming to a service model may be implemented by adaptively adjusting the DRX start offset, to ensure that data packets can be transmitted or sent in PDB. Therefore, packet loss rate may be reduced, the experience of users in system throughput, delay, reliability, and mobility may be ensured, and effective energy-saving may be realized.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a block diagram of a wireless communications system to which embodiments of this application can be applied;

FIG. 2 is a schematic flowchart of a discontinuous reception DRX configuration method according to an embodiment of this application;

FIG. 5 is a schematic flowchart of another discontinuous reception DRX configuration method another according to an embodiment of this application;

FIG. 6 is a schematic flowchart of a structure of a discontinuous reception DRX configuration apparatus according to an embodiment of this application;

FIG. 7 is a schematic flowchart of a structure of another discontinuous reception DRX configuration apparatus according to an embodiment of this application;

DETAILED DESCRIPTION

Figure 3:
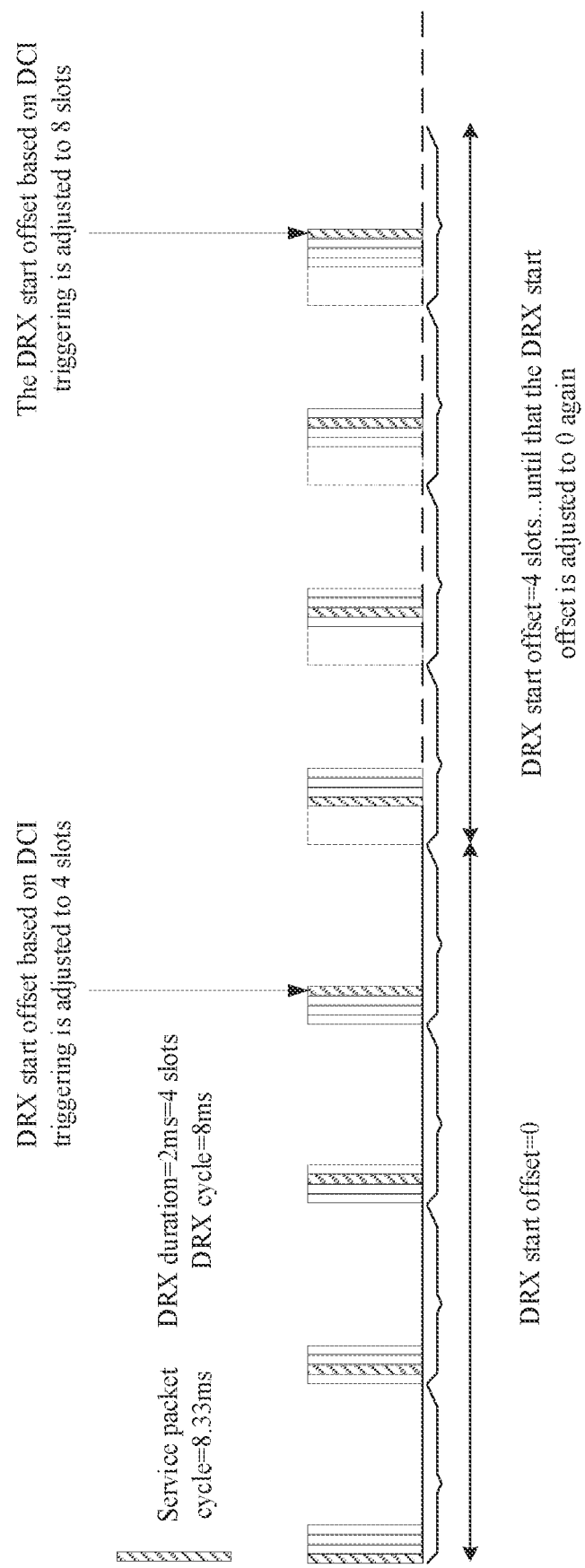
FIG. 3 is a schematic diagram of an expected data packet scheduling location according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in this application is not limited to a Long Term Evolution (LTE)/LTE-Advanced (LTE-A) system, and may also be used in other wireless communication systems, for example, Code Division Multiple Access (CDMA), Time Division Multiple Access (TDMA), Frequency Division Multiple Access FDMA), Orthogonal Frequency Division Multiple Access (OFDMA), and Single-carrier Frequency-Division Multiple Access (SC-FDMA). The terms "system" and "network" in the embodiments of this application may be used interchangeably. The technologies described can be applied to both the systems and the radio technologies mentioned above as well as to other systems and radio technologies. However, in the following descriptions, a New Radio (NR) system is described for an illustration purpose, and NR terms are used in most of the following descriptions, although these technologies may also be applied to other applications than an NR system application, such as a 6th Generation (6G) communications system.

FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, or a laptop computer, or called a notebook computer, a Personal Digital Assistant (PDA), a palmtop computer, a netbook, an ultra mobile personal computer (UMPC), a Mobile Internet Device (MID), a wearable device, a Vehicle UE (VUE), or a Pedestrian UE (PUE). The wearable device includes bracelets, headphones, glasses, etc. It should be noted that a specific type of the terminal 11 is not limited in the embodiments of this application. The network side device 12 may be a base station or a core network. The base station may be referred to as a NodeB, an evolved Node B, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), or another suitable term in the field provided that a same technical effect is achieved. The base station is not limited to a specific technical term. It should be noted that, in this application, only a base station in an NR system is used as an example, but a specific type of the base station is not limited.

With reference to the accompanying drawings, a discontinuous reception DRX configuration method provided in the embodiments of this application is described in detail by using specific embodiments and application scenarios.

Refer to FIG. 2. An embodiment of this application provides a discontinuous reception DRX configuration method. The method is performed by a terminal device and includes the followings steps.

Step 201: Obtain DRX start offset information by a first method; and

Step 203: Determine a target DRX start offset based on the DRX start offset information (drx-startoffset).

The DRX start offset information is used to determine the target DRX start offset, and further used to determine a start subframe of a DRX cycle, or determine a start moment of a DRX duration timer (drx-onDuration Timer).

The first method includes at least one of (1)-(3) below.

(1) Receive first Downlink Control Information (DCI).

The first DCI carries the DRX start offset information.

Further in some embodiments, in a case that the DRX start offset information is obtained by receiving the first DCI, the DRX start offset information includes T DRX start offset indications, the DRX start offset indication includes effective delay of the DRX start offset indication and at least one of W target DRX start offsets, and T and W are integers greater than or equal to 1. Therefore, the target DRX start offset may be determined based on effective delay of a DRX start offset indication included in the DRX start offset indications and/or the W target DRX start offsets.

It may be understood that, based on T DRX start offset indications carried in the first DCI, each DRX start offset indication includes the W target DRX start offsets and/or the effective delay of the DRX start offset indication. The terminal device may determine a target DRX start offset to be used after the effective delay of the DRX start offset indication.

The DRX start offset indication may be used to indicate drx-startoffset information of a long DRX (LongDRX) and/or drx-startoffset information of short DRX (shortDRX). A value of the drx-startoffset of the LongDRX may be the same as or different from a value of the drx-startoffset of the shortDRX.

The first DCI may include any one of the following: scheduling DCI, non-scheduling DCI, non-backoff DCI, dedicated DCI for the terminal device, or group common DCI. For example, when the first DCI is the non-scheduling DCI and the group common DCI, the first DCI may be DCI 2-6 or DCI 2-0.

In an example, if the first DCI is DCI2-6 or DCI2-0 and Tis 4, each terminal device corresponds to its DRX start offset indication, and a network side device configures a specific location of a DRX start offset indication corresponding to a terminal is configured by network. The T DRX start offset indications are respectively used to indicate target DRX start offset (drx-startoffset) of each UE.

(2) Configure the DRX start offset information by the network side device or stipulate the DRX start offset information in a protocol.

Further in some embodiments, in a case that the DRX start offset information is obtained based on the configuration of the network side device or the stipulation in the protocol, the DRX start offset information includes at least one of a default DRX start offset or default effective delay of a DRX start offset indication.

It should be noted that, application scenarios of the default DRX start offset and/or the default effective delay of the DRX start offset indication include the following: When the terminal device receives backoff DCI (for example: DCI 0-0 or DCI 1-0) or does not detect the first DCI, the DRX start offset information is not configured by the network side device or not stipulated in the protocol according to (1) or (2), or the network side device does not configure the DRX start offset, the terminal device uses the default DRX start offset and/or the default effective delay of the DRX start offset indication, that is, the default DRX start offset in this case is the target DRX start offset.

For example, because the backoff DCI excluded the T DRX start offset indications, when the backoff DCI is received based on the stipulation in the protocol, corresponding backoff of the terminal device is that the terminal device uses the default DRX start offset.

It should be understood that, based on the configuration of the network side device or the stipulation in the protocol, any one of the default DRX start offset and/or the default effective delay of the DRX start offset indication is adopted as the default DRX start offset and/or the default DRX start offset indication.

(3) Obtain first information, where the first information carries the DRX start offset information.

Further in some embodiments, in a case that the DRX start offset information is obtained by obtaining the first information, the DRX start offset information includes at least one of the following:

an expected data packet scheduling location; N candidate DRX start offset patterns, respectively corresponding to different DRX start offsets, where N is an integer greater than or equal to 1; an active sequence of the N candidate DRX start offset patterns; or duration of the N candidate DRX start offset patterns.

The first information may include but is not limited to one of the following: Radio Resource Control (RRC), Media Access Control (MAC) Control Element (CE), or DCI. The expected data packet scheduling location may be understood as a data packet arrival or sending location. The expected data packet scheduling location may be understood as a time unit in which scheduling to be executed. The time unit may be a slot, a subframe, or a symbol. A unit of the duration of the candidate DRX start offset patterns may be a DRX cycle. The unit of the duration of the candidate DRX start offset patterns may also be active time of the candidate DRX start offset patterns. For example, if duration of a candidate DRX start offset pattern 1 is 10 DRX cycles, the target DRX start offset may be determined based on the candidate DRX start offset pattern 1 within the corresponding 10 DRX cycles. The first information may be used to indicate the DRX start offset information of the LongDRX and/or the DRX start offset information of the shortDRX, and values of related parameters may be the same or not common.

In this embodiment of this application, the DRX start offset information for determining the target DRX start offset may be obtained by different methods. The DRX start offset information may be obtained by an explicit indication of the first DCI, that is, the DRX start offset information is carried in the first DCI, to adjust the DRX start offset based on the explicit triggering of the DCI. In another aspect, the DRX start offset information may be obtained based on the configuration of the network side device or the stipulation in the protocol. In still another aspect, the DRX start offset information may also be obtained by implicit or semi-implicit indication of the first information, that is, the DRX start offset information is carried in the first information, to adjust the DRX start offset based on implicit or semi-implicit triggering of the first information. In this way, a DRX-related configuration conforming to a data packet arrival cycle may be implemented by adjusting the DRX start offset, to ensure that the expected data packet scheduling or transmission location can fall within a PDCCH monitoring range such as duration of the DRX cycle, and data packets can be transmitted or sent in PDB. Therefore, packet loss rate may be reduced, experience of users in system throughput, delay, reliability and mobility may be ensured, and effective energy-saving may be realized.

It should be noted that, according to the discontinuous reception DRX configuration method in this embodiment of this application, the stipulation in the protocol may be understood as pre-stipulation, pre-definition, or pre-regulation.

According to some embodiments of the discontinuous reception DRX configuration method, the W target DRX start offsets takes effect after an interval of the effective delay of the DRX start offset indication from a first moment. The first moment is an end moment of receiving the last symbol of a first PDCCH carrying the first DCI, the effective delay of the DRX start offset indication has M time units, and M is an integer greater than or equal to 0.

According to some embodiments of the discontinuous reception DRX configuration method, the DRX start offset indication indicates the W target DRX start offsets by one of the following:

(1) Indicate index values of the W target DRX start offsets.

It can be understood as that, a bit string (Bitstring) is used to indicate, that is, the index values of DRX start offset patterns are obtained by mapping the DRX start offsets with bits, where each index value respectively represents a different DRX start offset. For example, 3 DRX start offsets configured by the network side device are mapped with 2 bits one by one. "00" represents a DRX start offset 1, "01" represents a DRX start offset 2, and "10" represents a DRX start offset 3.

(2) Indicate index values of W target objects. The W target objects are W target time unit groups in A time unit groups obtained by dividing time units included in a DRX cycle into equal parts, and A is an integer greater than or equal to 1.

It can be understood as that, a bit string (Bitstring) is used to indicate, that is, the A time unit groups is obtained by dividing the time units included in the DRX cycle, and index values of the time unit groups are mapped with ceiling (log 2 (A)) bits, and the first (complete) time unit in the time unit groups is stipulated as a start subframe of DRX duration (onduration), that is, the target DRX starting offset is indicated with the index values of the time unit groups carried in DCI.

(3) Indicate index values of W target bitmaps. Each bit included in the W target bitmaps represents Y time units in the DRX cycle, and Y is an integer greater than or equal to 1.

It can be understood that a Bitmap is used to indicate, that is, the Y time units in the DRX cycle correspond to one bit. In some embodiments, '0' represents the non DRX start offset (drx-startoffset) at the location, and '1' represents that a subframe where the first time unit is at the location is a start subframe of the DRX cycle, that is, the corresponding target DRX start offset. Further, the product of a quantity of all '0' before '1' in the Bitmap and Y is equal to the magnitude of the DRX start offset, where Y is less than or equal to the DRX cycle. The time unit may be a subframe, a symbol, or a slot.

In an example, the first DCI may indicate one target drx-startoffset in bitmap. For example, bitmap is 4 bits, and each bit represents 2 ms (2 subframes). '0010' represents drx-startoffset=2*2=4 ms. '0001' represents drx-startoffset=3*2=6 ms.

According to some embodiments of the discontinuous reception DRX configuration method, in a case that the DRX start offset information includes the expected data packet scheduling location, the method further includes the following steps.

Determine a target DRX start offset corresponding to the expected data packet scheduling location, where the target DRX start offset meets a first condition, and the first condition includes at least one of the following: the expected data packet scheduling location is with in duration of a DRX cycle that is associated with the target DRX start offset; or a start moment of the DRX cycle that is associated with the target DRX start offset is closest to the expected data packet scheduling location.

It can be understood that the expected data packet scheduling location may be one or more expected data packet scheduling locations. In addition, a method or a formula of a target DRX start offset corresponding to each expected scheduling location may be determined based on the expected data packet scheduling location based on the stipulation in the protocol. For example, the terminal device judges in sequence whether each DRX start offset in a plurality of DRX start offsets configured by a network meets the first condition and/or the second condition, to finally determine a unique target DRX start offset corresponding to a certain expected data packet scheduling location. A target DRX start offset corresponding to a next expected data packet scheduling location is continuously judged. It can be understood that, the judgment complexity of the terminal device is O (U*L), where U represents a quantity of data packets (each data packet has its own different expected scheduling location), and L represents a quantity of all DRX start offsets configured by the network or is equal to N.

According to some embodiments of the discontinuous reception DRX configuration method, in a case that the DRX start offset information includes the expected data packet scheduling location and the N candidate DRX start offset patterns, the method further includes: determining a target DRX start offset pattern corresponding to the expected data packet scheduling location, where the target DRX start offset pattern meets a second condition; and the second condition includes at least one of the following: the expected data packet scheduling location is within duration of a DRX cycle that is associated with the target DRX start offset pattern; or a start moment of the DRX cycle that is associated with the target DRX start offset pattern is closest to the expected data packet scheduling location, where the target DRX start offset pattern is any one of the N candidate DRX start offset patterns.

It can be understood that the expected data packet scheduling location may be one or more expected data packet scheduling locations. In addition, a method or a formula of a target DRX start offset corresponding to each expected scheduling location may be determined based on the expected data packet scheduling location based on the stipulation in the protocol. For example, the terminal device judges in sequence whether each DRX start offset corresponding to each candidate DRX start offset pattern in the N candidate DRX start offset patterns configured by the network meets the first condition and/or the second condition, to finally determine a unique target DRX start offset corresponding to a certain expected data packet scheduling location. A target DRX start offset corresponding to a next expected data packet scheduling location is continuously judged. It can be understood that, the judgment complexity of the terminal device is O (U*N), where U represents a quantity of data packets (each data packet bas its own different expected scheduling location).

According to some embodiments of the discontinuous reception DRX configuration method, the N candidate DRX start offset patterns are determined based on at least one of the following: a length of a DRX cycle; a length of DRX duration; or the expected data packet scheduling location.

The length of the DRX duration may be understood as a length of drx-ondurationtimer.

According to some embodiments of the discontinuous reception DRX configuration method, each target DRX start offset in the W target DRX start offsets respectively corresponds to a different cycle type of DRX, or each target DRX start offset in the W target DRX start offsets respectively corresponds to a different DRX group.

The different cycle type of DRX may be a long DRX cycle or a short DRX cycle. DRX parameters configured for different DRX groups are not common.

According to some embodiments of the discontinuous reception DRX configuration method, in a case that the first DCI is a group common DCI, the T DRX start offset indications respectively correspond T users. In other words, the first DCI may indicate DRX start offset information corresponding to a plurality of terminal devices (that is, the T users, where T is greater than or equal to 2).

According to some embodiments of the discontinuous reception DRX configuration method, before receiving the first DCI in the step 201, the method further includes the following steps.

Report second information, where the second information is used to indicate whether the terminal device supports configuration of the DRX start offset indication. In this way, the network side device may determine, based on a related capability reported by the terminal device, whether to configure or not configure the DRX start offset indication included in the first DCI.

According to some embodiments of the discontinuous reception DRX configuration method, in a case that the N candidate DRX start offset patterns are configured by the network side device, the method further includes the following steps.

(1) Activate, based on media access control control element MAC CE signaling, Q DRX start offset patterns in the N candidate DRX start offset patterns, and activate, based on a second DCI, R DRX start offset patterns in the Q DRX start offset patterns.
(2) Activate, based on the MAC CE signaling, the Q DRX start offset patterns in the N candidate DRX start offset patterns.
(3) Activate, based on the second DCI, R DRX start offset patterns in the N candidate DRX start offset patterns.

Further in some embodiments, the second DCI also includes at least one of the following: indication information of an active sequence of R candidate DRX start offset patterns, or indication information of duration of the R candidate DRX start offset patterns.

In an example, the first DCI is DCI 0-1/1-1, and a new DRX start offset indication is added to DCI 0-1/1-1 based on the stipulation in the protocol, with a value range of 0-5 bits. The network side device configures the DRX start offset indication added to DCI 0-1/1-1 as 2 bits. The DRX start offset indication is used to indicate a value of one target DRX start offset (drx-startoffset). The DRX start offset indication is applied to drx-startoffset of a long DRX cycle and drx-startoffset of a short DRX cycle, that is, the long/short DRX cycles share one drx-startoffset.

The effective delay of the DRX start offset indication is the first DRX cycle at an interval of 5 symbols after the last symbol of a PDCCH carrying the first DCI is received.

Calculate start subframes of the long DRX cycle and the short DRX cycles according to a formula [(SFN×10)+subframe number] modulo (drx-LongCycle)=drx-StartOffset or [(SFN×10)+subframe number] modulo (drx-ShortCycle)=(drx-StartOffset) modulo (drx-ShortCycle).

Further, the network side device maps the drx-startoffset by bitstring. '00' represents drx-startoffset=0 ms, '01' represents drx-startoffset=2 ms, '10' represents drx-startoffset=4 ms, and '11' represents drx-startoffset=6 ms.

Parameters of a XR service model: cycle is 8.33 ms, and packet arrival at equal intervals.

DRX cycle: 8 ms, and DRX onduration=2 ms.

Refer to FIG. 3. For the first four DRX cycles, drx-startoffset=0 ms. However, because a service packet does not completely match the DRX cycle, a packet arrival location moves backward relative to drx-startoffset within duration of the first four DRX cycles. To compensate drx-startoffset, the network side device triggers, within onduration of the fourth DRX cycle, update of drx-startoffset by scheduling the DRX start offset indication '01' carried in DCI 1-1. A start or restart process of drx-ondurationtimer due to packet arrival is omitted in FIG. 3.

After a DRX start of the effective delay of the DRX cycle start offset indication starts, the terminal device uses drx-startoffset=2 ms. The update drx-startoffset may be calculated according to a formula [(SFN×10)+subframe number] modulo (drx-LongCycle)=drx-StartOffset, to determine the start subframe of the DRX cycle, that is, the target DRX start offset.

In this example, the network side device dynamically triggers the update of drx-startoffset through DCI based on data packet arrival moment, a starting point of DRX onduration, and a data packet offset, to enable the DRX onduration to contain the data packet arrival moment, so that a data packet may be scheduled and transmitted in the PDB, and energy-saving of the terminal device may be realized.

In some embodiments, to save DCI bits, the network side device may map the drx-startooffset with 1 bit, for example, '0' represents drx-startoffset=0 ms, '1' represents drx-startoffset=4 ms. Therefore, while data packet arrival is covered with DR Xonduration as much as possible, packet delay caused by DRX configuration may be reduced.

In another example, all possible patterns and related parameters are configured by the network side device or stipulated in the protocol. In comparison with dynamic indication with the first DCI, obtaining the DRX start offset information through the first information means obtaining all pieces of information at one time, and then the drx-startoffset may be updated according to implicit rules without more signaling overhead.

The candidate DRX start offset patterns and corresponding parameters configured by the network side device or stipulated in the protocol includes but not limited to the following four types.

$$\text{drx-startoffset}=(\text{drx-ondurationtimer}*\text{pattern-index})$$
$$\text{modulo (drx-LongCycle);pattern-index}=0\sim\lfloor\text{drx-cycle/drx-ondurationtimer}\rfloor;\qquad\text{Formula:}$$

Figure 4:
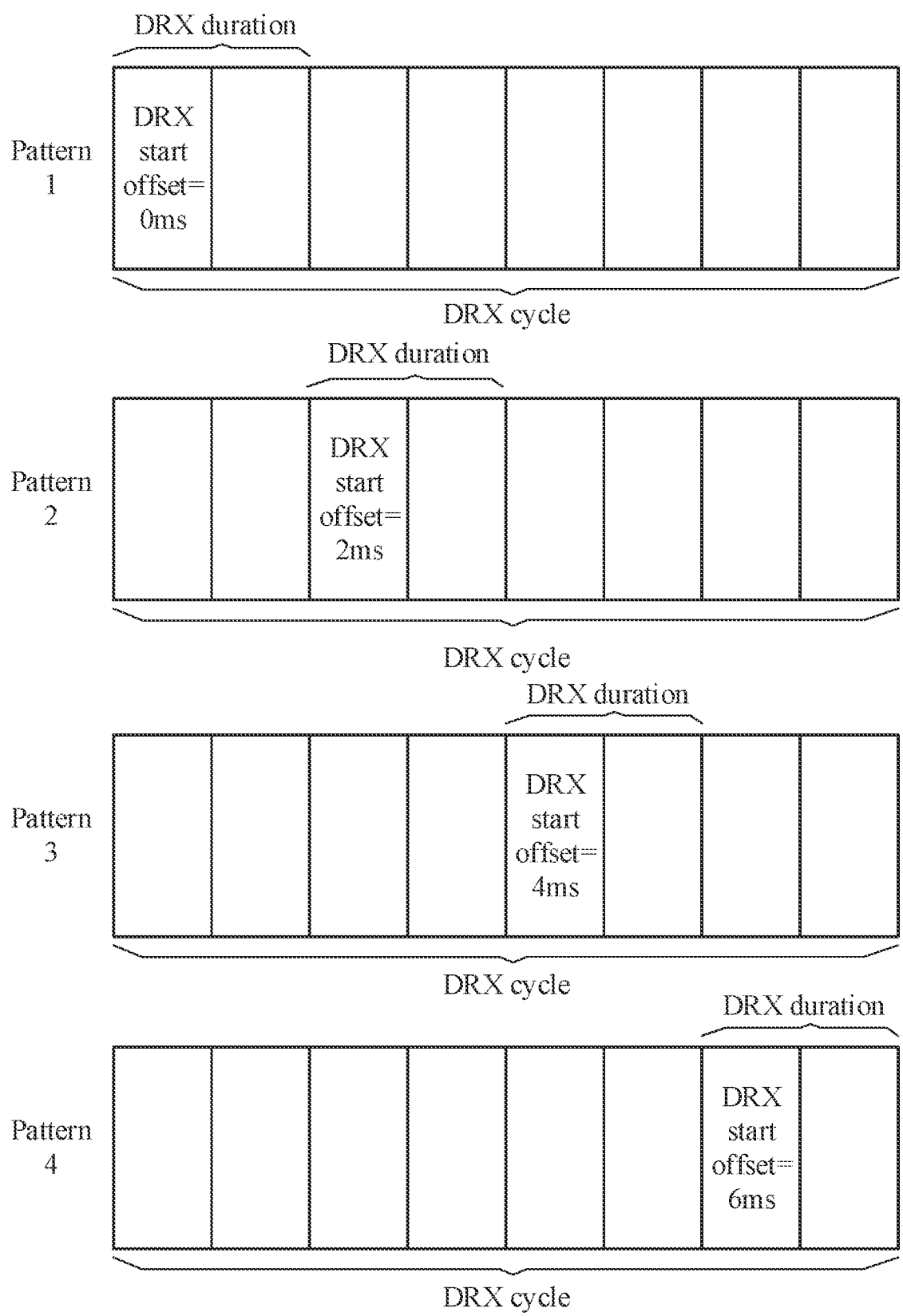
FIG. 4 is a schematic diagram of a candidate DRX start offset pattern according to an embodiment of this application.

The candidate DRX start offset patterns are activated in sequence from small to large (pattern1→pattern2→pattern3→pattern4) based on indexes of the patterns, activation duration of each pattern is 2 DRX cycles, 3 DRX cycles, 2 DRX cycles, and 3 DRX cycles, that is, drx-startoffset=0 ms corresponding to a pattern 1, drx-startoffset=2 ms corresponding to a pattern 2, drx-startoffset=4 ms corresponding to a pattern 3, and drx-startoffset=6 ms corresponding to a pattern 4 as shown in FIG. 4.

Parameters of the XR service model: cycle is 8.33 ms, and the packet arrival at equal intervals.

The DRX cycle: 8 ms, and DRX onduration=2 ms.

In this example, by adding a plurality of sets of drx-startoffset configurations, each set of configurations includes drx-startoffset and DRX duration. Based on the configurations of the pattern, the corresponding pattern is periodically and cyclically activated, so that the data packet arrival is covered with DRXonduration as much as possible, and therefore, the data packet may be scheduled and transmitted in the PDB, and energy-saving of the terminal device may be realized.

In some embodiments, the network side device may configure uppermost patterns equal to the length of the DRX cycle (for example, if the DRX cycle=8 ms, there are a maximum of 8 patterns), and then the four patterns may be indicated and activated with MACCE (or DCI).

In some embodiments, functions of the pattern may be enabled through the DCI. The DCI further includes: 4 activated candidate DRX start offset patterns, an active sequence of the 4 candidate DRX start offset patterns, and duration of each candidate DRX start offset pattern.

In another example, the network side device notifies the terminal device of the expected data packet scheduling location through the first information, and obtains currently activated drx-startoffset based on a processing procedure stipulated in the protocol.

The expected data packet scheduling location configured by the network side device is: a complete cycle→(SFN×10)+subframe n1; (SFN×10)+subframe n9; (SFN×10)+subframe n18; and (SFN×10)+subframe n26.

The DRX cycle: 8 ms, and DRX onduration=2 ms. The processing procedure is:
  initialization: A start subframe of the DRX cycle determined by an initial value of Drx-startoffset is the same as a start subframe in which a scheduling location of the first data packet configured by the network side device, that is, (SFN×10)+subframe n1; whether the data packet scheduling location judged in sequence can satisfy that the data packet is covered with the DRX onduration within the DRX onduration; if the data packet can be covered, drx-startoffset is not updated. If a certain data packet is not in the DRXonduration, drx-startoffset is updated, to ensure that a start subframe of a DRX cycle determined by an initial value of the updated Drx-startoffset is the same as a subframe of a scheduling location of the data packet, and a next data packet is continuously and circularly judged in sequence.

In this example, according to the expected data packet scheduling location configured through the first information and in combination with the processing procedure, signaling overhead may be greatly saved, the data packet may be scheduled and transmitted in the PDB, and energy-saving of the terminal device may be realized.

It should be noted that, the discontinuous reception DRX configuration method in this embodiment of this application is not limited to XR, but can also be applied to scenarios such as NRlight.

Refer to FIG. 5. An embodiment of this application provides a discontinuous reception DRX configuration method. The method is performed by a network side device and includes the followings steps.

Step 301. Provide, by a first method, DRX start offset information for a terminal device, where the DRX start offset information is used to determine a target DRX start offset.

The DRX start offset information is used to determine the target DRX start offset, and further used to determine a start subframe of a DRX cycle, or determine a start moment of a DRX duration timer (drx-onDuration Timer).

The first method includes at least one of the following:
  (1) Send first downlink control information DCI, where the first DCI carries the DRX start offset information.

Further in some embodiments, in a case that the DRX start offset information is provided by sending the first DCI, the DRX start offset information includes T DRX start offset indications, the DRX start offset indication includes effective delay of the DRX start offset indication and at least one of W target DRX start offsets, and T and W are integers greater than or equal to 1. Therefore, the terminal device may determine the target DRX start offset based on effective delay of a DRX start offset indication included in the DRX start offset indications and/or the W target DRX start offsets.

It may be understood that, based on T DRX start offset indications carried in the first DCI, each DRX start offset indication includes the W target DRX start offsets and/or the effective delay of the DRX start offset indication. The terminal device may determine a target DRX start offset to be used after the effective delay of the DRX start offset indication.

The DRX start offset indication may be used to indicate drx-startoffset information of a long DRX (LongDRX) and/or drx-startoffset information of short DRX (shortDRX). A value of the drx-startoffset of the LongDRX may be the same as or different from a value of the drx-startoffset of the shortDRX.

The first DCI may include any one of the following: scheduling DCI, non-scheduling DCI, non-backoff DCI, dedicated DCI for the terminal device, or group common DCI. For example, when the first DCI is the non-scheduling DCI and the group common DCI, the first DCI may be DCI 2-6 or DCI 2-0.

In an example, if the first DCI is DCI2-6 or DCI2-0 and T is 4, each terminal device corresponds to its DRX start offset indication, and the network side device configures a specific location of a corresponding DRX start offset indication corresponding to a terminal is configured by network. The T DRX start offset indications are respectively used to indicate target DRX start offset (drx-startoffset) of each UE.

(2) Configure the DRX start offset information.

Further in some embodiments, in a case that the DRX start offset information is provided by configuring, the DRX start offset information includes at least one of a default DRX start offset or default effective delay of a DRX start offset indication.

It should be noted that, application scenarios of the default DRX start offset and/or the default effective delay of the DRX start offset indication includes the following: When the terminal device receives backoff DCI (for example: DCI 0-0 or DCI 1-0) or does not detect the first DCI, the DRX start offset information is not configured by the network side device or not stipulated in the protocol according to (1) or (2), or the network side device does not configure the DRX start offset, the terminal device uses the default DRX start offset and/or the default effective delay of the DRX start offset indication, that is, the default DRX start offset in this case is the target DRX start offset.

For example, because the backoff DCI excluded the T DRX start offset indications, when the backoff DCI is received based on the stipulation in the protocol, corresponding backoff of the terminal device is that the terminal device uses the default DRX start offset.

It should be understood that, based on the configuration of the network side device or the stipulation in the protocol, any one of the DRX start offset and/or the effective delay of the DRX start offset indication is adopted as the default DRX start offset and/or the default DRX start offset indication.

(3) Send first information, where the first information carries the DRX start offset information.

Further in some embodiments, in a case that the DRX start offset information is provided by sending the first information, the DRX start offset information includes at least one of the following: an expected data packet scheduling location; N candidate DRX start offset patterns, respectively corresponding to different DRX start offsets, where N is an integer greater than or equal to 1; an active sequence of the N candidate DRX start offset patterns; or duration of the N candidate DRX start offset patterns.

The first information may include one of the following: RRC, MACCE, or DCI. The expected data packet scheduling location may be understood as a data packet arrival or sending location. The expected data packet scheduling location may be understood as a time unit in which scheduling to be executed. The time unit may be a slot, a subframe, or a symbol. A unit of the duration of the candidate DRX start offset patterns may be a DRX cycle. The unit of the duration of the candidate DRX start offset patterns may also be active time of the candidate DRX start offset patterns. For example, if duration of a candidate DRX start offset pattern 1 is 10 DRX cycles, the target DRX start offset may be determined based on the candidate DRX start offset pattern 1 within the corresponding 10 DRX cycles. The first information may be used to indicate the DRX start offset information of the LongDRX and/or the DRX start offset information of the shortDRX, and values of related parameters may be the same or not common.

In this embodiment of this application, the DRX start offset information for determining the target DRX start offset may be provided for the terminal device by different methods. The DRX start offset information may be provided by an explicit indication of the first DCI, that is, the DRX start offset information is carried in the first DCI, to adjust the DRX start offset based on the explicit triggering of the DCI In another aspect, the DRX start offset information may be provided by configuring by a network. In still another aspect, the DRX start offset information may also be provided by implicit or semi-implicit indication of the first information, that is, the DRX start offset information is carried in the first information, to adjust the DRX start offset based on implicit or semi-implicit triggering of the first information. In this way, DRX configurations conforming to a service model may be implemented by adaptively adjusting the DRX start offset, to ensure that data packets can be transmitted or sent in PDB. Therefore, packet loss rate may be reduced, experience of users in system throughput, delay, reliability and mobility may be ensured, and effective energy-saving may be realized.

According to the discontinuous reception DRX configuration method in this embodiment of this application, the W target DRX start offsets takes effect after an interval of the effective delay of the DRX start offset indication from a first moment. The first moment is an end moment of receiving the last symbol of a first PDCCH carrying the first DCI, the effective delay of the DRX start offset indication has M time units, and M is an integer greater than or equal to 0.

According to some embodiments of the discontinuous reception DRX configuration method, the DRX start offset indication indicates the W target DRX start offsets by one of the following:

(1) Indicate index values of the W target DRX start offsets.

It can be understood as that, a bit string (Bitstring) is used to indicate, that is, the index values of DRX start offset patterns are obtained by mapping the DRX start offsets with bits, where each index value respectively represents a different DRX start offset. For example, 3 DRX start offsets configured by the network side device are mapped with 2 bits one by one. "00" represents a DRX start offset 1, "01" represents a DRX start offset 2, and "10" represents a DRX start offset 3.

(2) Indicate index values of W target objects. The W target objects are W target time unit groups in A time unit groups obtained by dividing time units included in the DRX cycle into equal parts, and A is an integer greater than or equal to 1.

It can be understood as that, a bit string (Bitstring) is used to indicate, that is, the A time unit groups is obtained by dividing the time units included in the DRX cycle, and index values of the time unit groups are mapped with ceiling (log 2 (A)) bits, and the first (complete) time unit in the time unit groups is stipulated as a start subframe of DRX duration (onduration), that is, the target DRX starting offset is indicated with the index values of the time unit groups carried in DCI.

(3) Indicate index values of W target bitmaps. Each bit included in the W target bitmaps represents Y time units in the DRX cycle, and Y is an integer greater than or equal to 1.

It can be understood that a Bitmap is used to indicate, that is, the Y time units in the DRX cycle correspond to one bit. In some embodiments, '0' represents the non DRX start offset (drx-startoffset) at the location, and '1' represents that a subframe where the first time unit at the location is the start subframe of the DRX cycle, that is, the corresponding target DRX start offset. Further, the product of a quantity of all '0' before '1' in the Bitmap and Y is equal to the magnitude of the DRX start offset, where Y is less than or equal to the DRX cycle. The time unit may be a subframe, a symbol, or a slot.

In an example, the first DCI may indicate one target drx-startoffset in bitmap. For example, bitmap is 4 bits, and each bit represents 2 ms (2 subframes). '0010' represents drx-startoffset=2*2=4 ms. '0001' represents drx-startoffset=3*2=6 ms.

According to some embodiments of the discontinuous reception DRX configuration method, in a case that the DRX start offset information includes the expected data packet scheduling location, the target DRX start offset pattern corresponding to the expected data packet scheduling location meets a first condition. The first condition includes at least one of the following: the expected data packet scheduling location is with in duration of a DRX cycle that is associated with the target DRX start offset; or a start moment of the DRX cycle that is associated with the target DRX start offset is closest to the expected data packet scheduling location.

It can be understood that the expected data packet scheduling location may be one or more expected data packet scheduling locations. In addition, a method or a formula of a target DRX start offset corresponding to each expected scheduling location may be determined based on the expected data packet scheduling location based on the stipulation in the protocol. For example, the terminal device judges in sequence whether each DRX start offset in a plurality of DRX start offsets configured by a network meets the first condition and/or the second condition, to finally determine a unique target DRX start offset corresponding to a certain expected data packet scheduling location. A target DRX start offset corresponding to a next expected data packet scheduling location is continuously judged. It can be understood that, the judgment complexity of the terminal device is O (U*L), where U represents a quantity of data packets (each data packet has its own different expected scheduling location), and L represents a quantity of all DRX start offsets configured by the network or is equal to N.

According to some embodiments of the discontinuous reception DRX configuration method, in a case that the DRX start offset information includes the expected data packet scheduling location and the N candidate DRX start offset patterns, the target DRX start offset pattern corresponding to the expected data packet scheduling location meets a second condition. The second condition includes at least one of the following: the expected data packet scheduling location is within duration of a DRX cycle that is associated with the target DRX start offset pattern; or a start moment of the DRX cycle that is associated with the target DRX start offset pattern is closest to the expected data packet scheduling location, where the target DRX start offset pattern is any one of the N candidate DRX start offset patterns.

It can be understood that the expected data packet scheduling location may be one or more expected data packet scheduling locations. In addition, the method or the formula of the target DRX start offset corresponding to each expected scheduling location may be determined based on the expected data packet scheduling location based on the stipulation in the protocol. For example, the terminal device judges in sequence whether each DRX start offset corresponding to each candidate DRX start offset pattern in the N candidate DRX start offset patterns configured by the network meets the first condition and/or the second condition, to finally determine the unique target DRX start offset corresponding to a certain expected data packet scheduling location. The target DRX start offset corresponding to a next expected data packet scheduling location is continuously judged. It can be understood that, the judgment complexity of the terminal device is O (U*N), where U represents a quantity of data packets (each data packet has its own different expected scheduling location).

According to some embodiments of the discontinuous reception DRX configuration method, the N candidate DRX start offset patterns are determined based on at least one of the following: a length of a DRX cycle; a length of DRX duration; or the expected data packet scheduling location. The length of the DRX duration may be understood as a length of drx-ondurationtimer.

According to some embodiments of the discontinuous reception DRX configuration method, each target DRX start offset in the W target DRX start offsets respectively corresponds to a different cycle type of DRX, or each target DRX start offset in the W target DRX start offsets respectively corresponds to a different DRX group.

The different cycle type of DRX may be a long DRX cycle or a short DRX cycle. DRX parameters configured for different DRX groups are not common.

According to some embodiments of the discontinuous reception DRX configuration method, in a case that the first DCI is a group common DCI, the T DRX start offset indications respectively correspond T users. In other words, the first DCI may indicate DRX start offset information corresponding to a plurality of terminal devices (that is, the T users, where T is greater than or equal to 2).

According to some embodiments of the discontinuous reception DRX configuration method, before sending the first DCI in the step 301, the method further includes the following steps.

Receive second information reported by the terminal device, where the second information is used to indicate whether the terminal device supports configuration of a DRX start offset indication. In this way, the network side device may determine, based on a related capability reported by the terminal device, whether to configure or not configure the DRX start offset indication included in the first DCI.

The discontinuous reception DRX configuration method in this embodiment of this application further includes one of the following:

(1) respectively sending, based on a sequence, media access control control element (MAC CE) signaling and a second DCI to the terminal device, where the MAC CE signaling is used to activate Q DRX start offset patterns in the N candidate DRX start offset patterns, and the second DCI is used to activate R DRX start offset patterns in the Q DRX start offset patterns;

(2) sending, to the terminal device, the MAC CE signaling used to activate Q DRX start offset patterns in the N candidate DRX start offset patterns; or (3) sending, to the terminal device, a second DCI used to activate R DRX start offset patterns in the N candidate DRX start offset patterns.

According to some embodiments of the discontinuous reception DRX configuration method, the second DCI further includes one of the following: indication information of an active sequence of R candidate DRX start offset patterns; or indication information of duration of the R candidate DRX start offset patterns.

It should be noted that, the discontinuous reception DRX configuration method in this embodiment of this application that is performed by the terminal device may be performed by a discontinuous reception DRX configuration apparatus or a control module that is in the discontinuous reception DRX configuration apparatus and that is configured to perform the discontinuous reception DRX configuration method. That the discontinuous reception DRX configuration apparatus in this embodiment of this application performs the discontinuous reception DRX configuration method is used as an example to describe the discontinuous reception DRX configuration apparatus provided in this embodiment of this application.

Refer to FIG. 6. An embodiment of this application provides a discontinuous reception DRX configuration apparatus 400. The discontinuous reception DRX configuration apparatus 400 includes an obtaining module 401 and a determining module 403.

The obtaining module 401 is configured to obtain DRX start offset information by a first method; and the determining module 403 is configured to determine a target DRX start offset based on the DRX start offset information. The first method includes at least one of the following: receiving first downlink control information DCI, where the first DCI carries the DRX start offset information; configuring the DRX start offset information by a network side device or stipulating the DRX start offset information in a protocol, or obtaining first information, where the first information carries the DRX start offset information.

According to some embodiments of the discontinuous reception DRX configuration apparatus 400, in a case that the DRX start offset information is obtained by receiving the first DCI, the DRX start offset information includes T DRX start offset indications, the DRX start offset indication includes effective delay of the DRX start offset indication and at least one of W target DRX start offsets, and T and W are integers greater than or equal to 1.

According to some embodiments of the discontinuous reception DRX configuration apparatus 400, in a case that the DRX start offset information is obtained based on the configuration of the network side device or the stipulation in the protocol, the DRX start offset information includes at least one of a default DRX start offset or default effective delay of a DRX start offset indication.

According to some embodiments of the discontinuous reception DRX configuration apparatus 400, in a case that the DRX start offset information is obtained by receiving the first information, the DRX start offset information includes at least one of the following: an expected data packet scheduling location; N candidate DRX start offset patterns, respectively corresponding to different DRX start offsets, where N is an integer greater than or equal to 1; an active sequence of the N candidate DRX start offset patterns; or duration of the N candidate DRX start offset patterns.

According to some embodiments of the discontinuous reception DRX configuration apparatus 400, the W target DRX start offsets takes effect after an interval of the effective delay of the DRX start offset indication from a first moment. The first moment is an end moment of receiving the last symbol of a first PDCCH carrying the first DCI, the effective delay of the DRX start offset indication has M time units, and M is an integer greater than or equal to 0.

According to some embodiments of the discontinuous reception DRX configuration apparatus 400, the DRX start offset indication indicates the W target DRX start offsets by one of the following: indicating index values of the W target DRX start offsets; indicating index values of W target objects, where the W target objects are W target time unit groups in A time unit groups obtained by dividing time units included in a DRX cycle into equal parts, and A is an integer greater than or equal to 1; or indicating index values of W target bitmaps, where each bit included in the W target bitmaps represents Y time units in the DRX cycle, and Y is an integer greater than or equal to 1.

According to some embodiments of the discontinuous reception DRX configuration apparatus 400, each target DRX start offset in the W target DRX start offsets respectively corresponds to a different cycle type of DRX, or each target DRX start offset in the W target DRX start offsets respectively corresponds to a different DRX group.

According to some embodiments of the discontinuous reception DRX configuration apparatus 400, the determining module 403 is further configured to: in a case that the DRX start offset information includes the expected data packet scheduling location, determine a target DRX start offset corresponding to the expected data packet scheduling location, where the target DRX start offset meets a first condition. The first condition includes at least one of the following: the expected data packet scheduling location is within duration of a DRX cycle that is associated with the target DRX start offset; or a start moment of the DRX cycle that is associated with the target DRX start offset is closest to the expected data packet scheduling location.

According to some embodiments of the discontinuous reception DRX configuration apparatus 400, the determining module 403 is further configured to: in a case that the DRX start offset information includes the expected data packet scheduling location and the N candidate DRX start offset patterns, determine a target DRX start offset pattern corresponding to the expected data packet scheduling location, where the target DRX start offset pattern meets a second condition. The second condition includes at least one of the following: the expected data packet scheduling location is within duration of a DRX cycle that is associated with the target DRX start offset pattern; or a start moment of the DRX cycle that is associated with the target DRX start offset pattern is closest to the expected data packet scheduling location, where the target DRX start offset pattern is any one of the N candidate DRX start offset patterns.

According to some embodiments of the discontinuous reception DRX configuration apparatus 400, the N candidate DRX start offset patterns are determined based on at least one of the following: a length of a DRX cycle; a length of DRX duration; or the expected data packet scheduling location.

According to some embodiments of the discontinuous reception DRX configuration apparatus 400, the N candidate DRX start offset patterns are configured by the network side device. The apparatus 400 further includes a processing module. The processing module is configured to perform at least one of the following operations: activating, based on media access control control element (MAC CE) signaling, Q DRX start offset patterns in the N candidate DRX start offset patterns, and activating, based on a second DCI, R DRX start offset patterns in the Q DRX start offset patterns; activating, based on the MAC CE signaling, the Q DRX start offset patterns in the N candidate DRX start offset patterns; or activating, based on the second DCI, R DRX start offset patterns in the N candidate DRX start offset patterns.

According to some embodiments of the discontinuous reception DRX configuration apparatus 400, the second DCI also includes at least one of the following: indication information of an active sequence of R candidate DRX start offset patterns, or indication information of duration of the R candidate DRX start offset patterns.

According to some embodiments of the discontinuous reception DRX configuration apparatus 400, in a case that the first DCI is a group common DCI, the T DRX start offset indications respectively correspond T users.

The discontinuous reception DRX configuration apparatus 400 in this embodiment of this application further includes a sending module, configured to receive the first DCI and report second information. The second information is used to indicate whether the terminal device supports configuration of a DRX start offset indication.

In this embodiment of this application, the DRX start offset information for determining the target DRX start offset may be obtained by different methods. The DRX start offset information may be obtained by an explicit indication of the first DCI, that is, the DRX start offset information is carried in the first DCI, to adjust the DRX start offset based on the explicit triggering of the DCI. In another aspect, the DRX start offset information may be obtained based on the configuration of the network side device or the stipulation in the protocol. In still another aspect, the DRX start offset information may also be obtained by implicit or semi-implicit indication of the first information, that is, the DRX start offset information is carried in the first information, to adjust the DRX start offset based on implicit or semi-implicit triggering of the first information. In this way, DRX configurations conforming to a service model may be implemented by adaptively adjusting the DRX start offset, to ensure that data packets can be transmitted or sent in PDB. Therefore, packet loss rate may be reduced, experience of users in system throughput, delay, reliability and mobility may be ensured, and effective energy-saving may be realized.

The discontinuous reception DRX configuration apparatus in this embodiment of this application may be an apparatus, or may be a component, an integrated circuit, or a chip in a terminal device. The apparatus may be a mobile terminal, or a non-mobile terminal. For example, the mobile terminal may include but is not limited to the foregoing listed types of terminals 11. The non-mobile terminal may be a server, a Network Attached Storage (NAS), a personal computer (PC), a television (TV), a teller machine, or a self-service machine. This is not specifically limited in this embodiment of this application.

The discontinuous reception DRX configuration apparatus in this embodiment of this application may be an apparatus with an operating system. The operating system may be an Android operating system, an iOS operating system, or another possible operating system. This is not specifically limited in the embodiments of this application.

The discontinuous reception DRX configuration apparatus in this embodiment of this application can implement processes of the method embodiment in FIG. 2, and a same technical effect can be achieved. To avoid repetition, details are not described herein again.

It should be noted that, the discontinuous reception DRX configuration method in this embodiment of this application that is performed by the network side device may be performed by a discontinuous reception DRX configuration apparatus or a control module that is in the discontinuous reception DRX configuration apparatus and that is configured to perform the discontinuous reception DRX configuration method. That the discontinuous reception DRX configuration apparatus in this embodiment of this application performs the discontinuous reception DRX configuration method is used as an example to describe the discontinuous reception DRX configuration apparatus provided in this embodiment of this application.

Refer to FIG. 7. An embodiment of this application provides a discontinuous reception DRX configuration apparatus 500. The discontinuous reception DRX configuration apparatus 500 includes a processing module 501, configured to provide, by a first method, DRX start offset information for a terminal device, where the DRX start offset information is used to determine a target DRX start offset. The first method includes at least one of the following: sending first downlink control information DCI, where the first DCI carries the DRX start offset information; configuring the DRX start offset information; or sending first information, where the first information carries the DRX start offset information.

According to some embodiments of the discontinuous reception DRX configuration apparatus 500, in a case that the DRX start offset information is provided by sending the first DCI, the DRX start offset information includes T DRX start offset indications, the DRX start offset indication includes effective delay of the DRX start offset indication and at least one of W target DRX start offsets, and T and W are integers greater than or equal to 1.

According to some embodiments of the discontinuous reception DRX configuration apparatus 500, in a case that the DRX start offset information is provided by configuring, the DRX start offset information includes at least one of a default DRX start offset indication or default effective delay of a DRX start offset indication.

According to some embodiments of the discontinuous reception DRX configuration apparatus 500, in a case that the DRX start offset information is provided by sending the first information, the DRX start offset information includes at least one of the following: an expected data packet scheduling location; N candidate DRX start offset patterns, respectively corresponding to different DRX start offsets, where N is an integer greater than or equal to 1; an active sequence of the N candidate DRX start offset patterns; or duration of the N candidate DRX start offset patterns.

According to some embodiments of the discontinuous reception DRX configuration apparatus 500, the W target DRX start offsets takes effect after an interval of the effective delay of the DRX start offset indication from a first moment. The first moment is an end moment of receiving the last symbol of a first PDCCH carrying the first DCI, the effective delay of the DRX start offset indication has M time units, and M is an integer greater than or equal to 0.

According to some embodiments of the discontinuous reception DRX configuration apparatus 500, the DRX start offset indication indicates the W target DRX start offsets by one of the following: indicating index values of the W target DRX start offsets; indicating index values of W target objects, where the W target objects are W target time unit groups in A time unit groups obtained by dividing time units included in a DRX cycle into equal parts, and A is an integer greater than or equal to 1; or indicating index values of W target bitmaps, where each bit included in the W target bitmaps represents Y time units in the DRX cycle, and Y is an integer greater than or equal to 1.

According to some embodiments of the discontinuous reception DRX configuration apparatus 500, each target DRX start offset in the W target DRX start offsets respectively corresponds to a different cycle type of DRX, or each target DRX start offset in the W target DRX start offsets respectively corresponds to a different DRX group.

According to some embodiments of the discontinuous reception DRX configuration apparatus 500, in a case that the DRX start offset information includes the expected data packet scheduling location, the target DRX start offset pattern corresponding to the expected data packet scheduling location meets a first condition. The first condition includes at least one of the following: the expected data packet scheduling location is with in duration of a DRX cycle that is associated with the target DRX start offset; or a start moment of the DRX cycle that is associated with the target DRX start offset is closest to the expected data packet scheduling location.

According to some embodiments of the discontinuous reception DRX configuration apparatus 500, in a case that the DRX start offset information includes the expected data packet scheduling location and the N candidate DRX start offset patterns, the target DRX start offset pattern corresponding to the expected data packet scheduling location meets a second condition. The second condition includes at least one of the following: the expected data packet scheduling location is within duration of a DRX cycle that is associated with the target DRX start offset pattern; or a start moment of the DRX cycle that is associated with the target DRX start offset pattern is closest to the expected data packet scheduling location, where the target DRX start offset pattern is any one of the N candidate DRX start offset patterns.

According to some embodiments of the discontinuous reception DRX configuration apparatus 500, the N candidate DRX start offset patterns are determined based on at least one of the following: a length of a DRX cycle; a length of DRX duration; or the expected data packet scheduling location.

The discontinuous reception DRX configuration apparatus 500 in this embodiment of this application further includes a sending module, configured to perform at least one of the following operations: respectively sending, based on a sequence, media access control control element (MAC CE) signaling and a second DCI to the terminal device, where the MAC CE signaling is used to activate Q DRX start offset patterns in the N candidate DRX start offset patterns, and the second DCI is used to activate R DRX start offset patterns in the Q DRX start offset patterns; sending, to the terminal device, the MAC CE signaling used to activate Q DRX start offset patterns in the N candidate DRX start offset patterns; or sending, to the terminal device, a second DCI used to activate R DRX start offset patterns in the N candidate DRX start offset patterns.

According to some embodiments of the discontinuous reception DRX configuration apparatus 500, the second DCI also includes at least one of the following: indication information of an active sequence of R candidate DRX start offset patterns, or indication information of duration of the R candidate DRX start offset patterns.

According to some embodiments of the discontinuous reception DRX configuration apparatus 500, in a case that the first DCI is a group common DCI, the T DRX start offset indications respectively correspond T users.

The discontinuous reception DRX configuration apparatus 500 in this embodiment of this application further includes a receiving module, configured to receive second information reported by the terminal device before sending the first DCI, where the second information is used to indicate whether the terminal device supports configuration of a DRX start offset indication.

In this embodiment of this application, the DRX start offset information for determining the target DRX start offset may be provided for the terminal device by different methods. The DRX start offset information may be provided by an explicit indication of the first DCI, that is, the DRX start offset information is carried in the first DCI, to adjust the DRX start offset based on the explicit triggering of the DCI In another aspect, the DRX start offset information may be provided by configuring by a network. In still another aspect, the DRX start offset information may also be provided by implicit or semi-implicit indication of the first information, that is, the DRX start offset information is carried in the first information, to adjust the DRX start offset based on implicit or semi-implicit triggering of the first information. In this way, DRX configurations conforming to a service model may be implemented by adaptively adjusting the DRX start offset, to ensure that data packets can be transmitted or sent in PDB. Therefore, packet loss rate may be reduced, experience of users in system throughput, delay, reliability and mobility may be ensured, and effective energy-saving may be realized.

The discontinuous reception DRX configuration apparatus in this embodiment of this application may be an apparatus, or may be a component, an integrated circuit, or a chip in a network side device. The apparatus may be a network side device. For example, the network side device may include but is not limited to the types of network side devices 12 listed above.

The discontinuous reception DRX configuration apparatus in this embodiment of this application may be an apparatus with an operating system. The operating system may be an Android operating system, an iOS operating system, or another possible operating system. This is not specifically limited in the embodiments of this application.

The discontinuous reception DRX configuration apparatus in this embodiment of this application can implement processes of the method embodiment in FIG. 5, and a same technical effect can be achieved. To avoid repetition, details are not described herein again.

Figure 8:
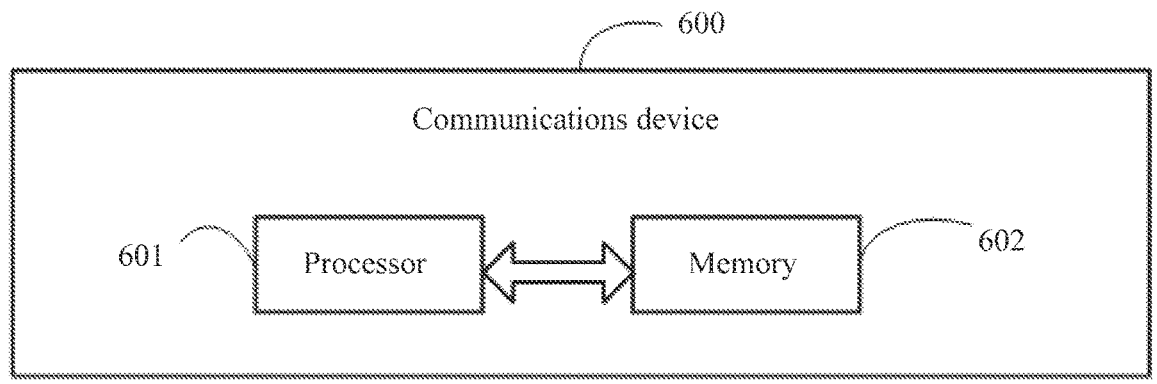
FIG. 8 is a schematic diagram of a structure of a communications device according to an embodiment of this application.

Refer to FIG. 8. An embodiment of this application further provides a communication device 600, including a processor 601, a memory 602, a program or an instruction that is stored in the memory 602 and that can run on the processor 601. For example, when the communication device 600 is a terminal, the program or the instruction is executed by the processor 601 to implement processes of the corresponding discontinuous reception DRX configuration method embodiment in FIG. 2, and a same technical effect can be achieved. When the communication device 600 is a network side device, the program or the instruction is executed by the processor 601 to implement processes of the corresponding discontinuous reception DRX configuration method embodiment in FIG. 5, and a same technical effect can be achieved. To avoid repetition, details are not described herein again.

Figure 9:
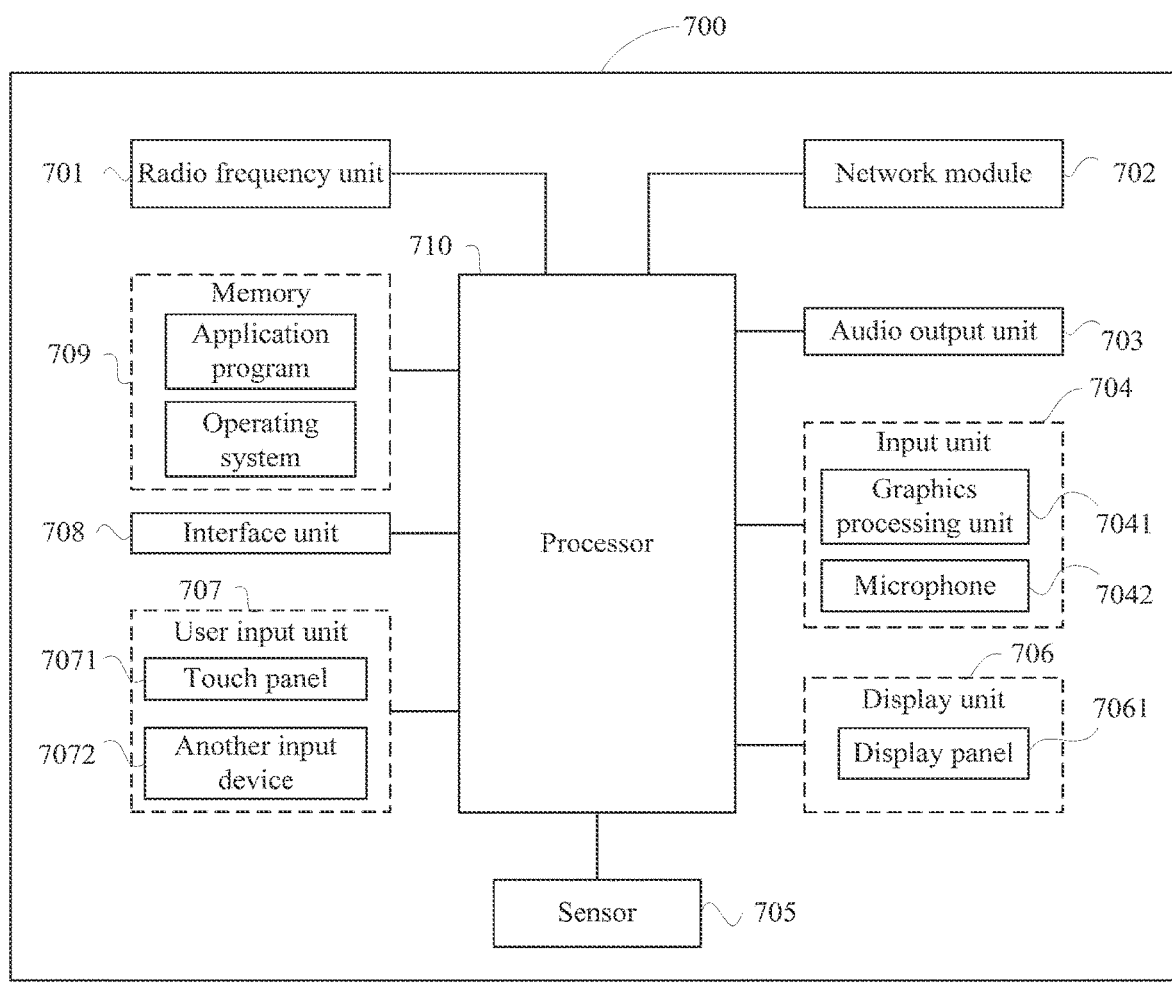
FIG. 9 is a schematic diagram of a structure of a terminal device according to an embodiment of this application.

FIG. 9 is a schematic diagram of a hardware structure of a terminal according to some embodiments.

A terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It may be understood by a person skilled in the art that the terminal 700 may further include a power supply (such as a battery) that supplies power to each component. The power supply may be logically connected to the processor 710 by using a power management system, to implement functions such as charging, discharging, and power consumption management by using the power management system. The terminal structure shown in FIG. 9 constitutes no limitation on the terminal, and the terminal may include more or fewer components than those shown in the figure, or combine some components, or have different component arrangements. Details are not described herein.

It should be understood that, in this embodiment of this application, the input unit 704 may include a Graphics Processing Unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061, and the display panel 7061 may be configured in a form of a liquid crystal display, an organic light emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, or may further include a non-volatile memory. The non-volatile memory may be a Read-Only Memory (ROM), a Programmable ROM (PROM), an Erasable PROM (EPROM), an Electrically EPROM (EEPROM), or a flash memory. For example, at least one disk storage component, a flash memory component, or another non-volatile solid-state storage component.

The processor 710 may include one or more processing units. In some embodiments, an application processor and a modem processor may be integrated into the processor 710. The application processor mainly processes an operating system, a user interface, an application, an instruction, or the like. The modem processor mainly processes wireless communications, for example, a baseband processor. It can be understood that, the modem processor may not be integrated into the processor 710.

The radio frequency unit 701 is configured to obtain DRX start offset information by a first method. The processor 710 is configured to determine a target DRX start offset based on the DRX start offset information. The first method includes at least one of the following: receiving first downlink control information DCI, where the first DCI carries the DRX start offset information; configuring the DRX start offset information by a network side device or stipulating the DRX start offset information in a protocol; or obtaining first information, where the first information carries the DRX start offset information.

In this embodiment of this application, the DRX start offset information for determining the target DRX start offset may be obtained by different methods. The DRX start offset information may be obtained by an explicit indication of the first DCI, that is, the DRX start offset information is carried in the first DCI, to adjust the DRX start offset based on the explicit triggering of the DCI. In another aspect, the DRX start offset information may be obtained based on the configuration of the network side device or the stipulation in the protocol. In still another aspect, the DRX start offset information may also be obtained by implicit or semi-implicit indication of the first information, that is, the DRX start offset information is carried in the first information, to adjust the DRX start offset based on implicit or semi-implicit triggering of the first information. In this way, DRX configurations conforming to a service model may be implemented by adaptively adjusting the DRX start offset, to ensure that data packets can be transmitted or sent in PDB. Therefore, packet loss rate may be reduced, experience of users in system throughput, delay, reliability and mobility may be ensured, and effective energy-saving may be realized.

Figure 10:
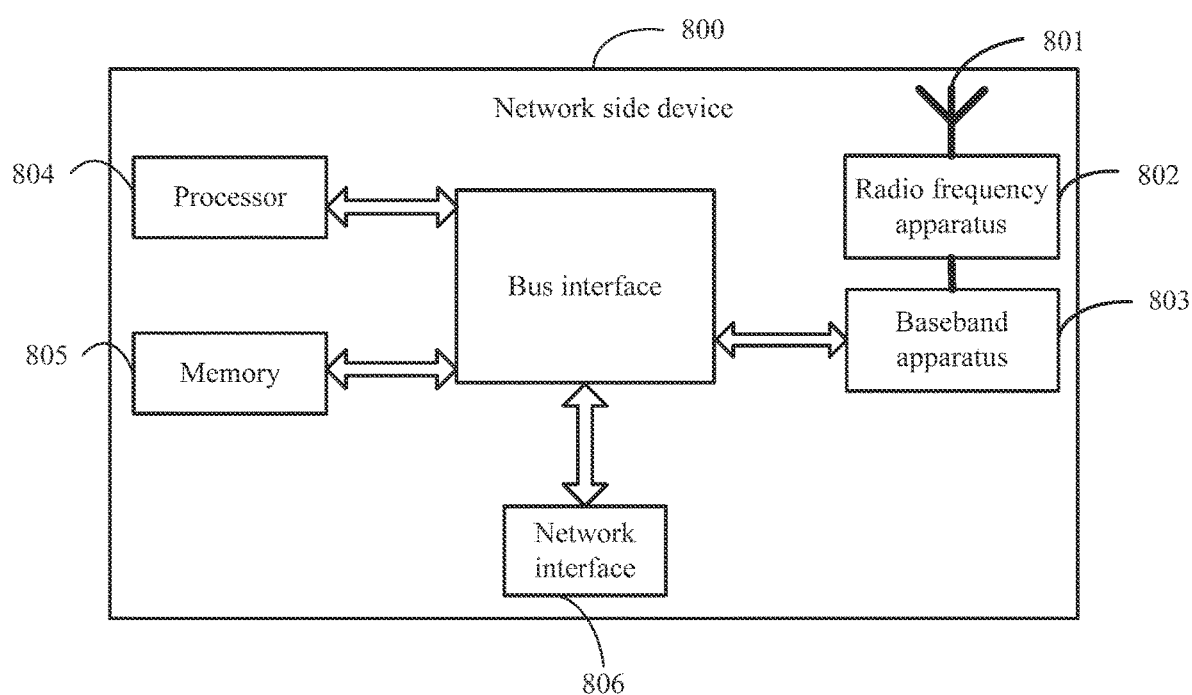
FIG. 10 is a schematic diagram of a structure of a network side device according to an embodiment of this application.

An embodiment of this application further provides a network side device. Refer to FIG. 10. A network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information to be sent and sends the information to the radio frequency apparatus 802, and the radio frequency apparatus 802 processes the received information and sends the information through the antenna 801.

The frequency band processing apparatus may be located in the baseband apparatus 803. The method performed by the network side device in the foregoing embodiment may be implemented in the baseband apparatus 803. The baseband apparatus 803 includes a processor 804 and a memory 805.

The baseband apparatus 803 may include, for example, at least one baseband board, and a plurality of chips are arranged on the baseband board. As shown in FIG. 10, one of the chips is, for example, the processor 804, which is connected to the memory 805, to invoke a program in the memory 805, so as to perform the operations of the network device shown in the method embodiment.

The baseband apparatus 803 may further include a network interface 806, configured to exchange information with the radio frequency apparatus 802, where the interface is, for example, a common public radio interface (CPRI).

In some embodiments, the network side device in this embodiment of the present application further includes an instruction or a program stored in the memory 805 and executable by the processor 804. The processor 804 invokes the instruction or the program in the memory 805 to perform the method performed by the modules shown in FIG. 7, and a same technical effect can be achieved. To avoid repetition, details are not described herein again.

An embodiment of this application further provides a readable storage medium. The readable storage medium stores a program or an instruction, and when the program or the instruction is executed by a processor, processes of the discontinuous reception DRX configuration method embodiment are implemented and a same technical effect can be achieved. To avoid repetition, details are not described herein again.

The processor is the processor in the terminal device or the network side device described in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a computer program product. The computer program product includes a processor, a memory, and a program or an instruction stored in the memory and capable of running on the processor. When the program or the instruction is executed by the processor, processes of the discontinuous reception DRX configuration method embodiment are implemented and a same technical effect can be achieved. To avoid repetition, details are not described herein again.

An embodiment of this application further provides a chip. The chip includes a processor and a communications interface, the communications interface is coupled to the processor, and the processor is configured to run a program or an instruction of a terminal device or a network side device to implement processes of the discontinuous reception DRX configuration method embodiment and a same technical effect can be achieved. To avoid repetition, details are not described herein again.

It should be understood that the chip mentioned in this embodiment of this application may also be referred to as a system-level chip, a system chip, a system on chip, a system chip on chip, and the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for discontinuous reception (DRX) configuration, performed by a terminal device, comprising:
   obtaining DRX start offset information by a first method; and
   determining a target DRX start offset based on the DRX start offset information,
   wherein the first method includes at least one of the following:
     receiving first downlink control information (DCI), wherein the first DCI carries the DRX start offset information;
     configuring the DRX start offset information by a network side device or stipulating the DRX start offset information in a protocol; or
     obtaining first information, wherein the first information carries the DRX start offset information,
   wherein when the DRX start offset information is obtained by obtaining the first information, the DRX start offset information comprises at least one of the following:
     an expected data packet scheduling location that is different from a start moment of the DRX cycle that is associated with the target DRX start offset;
     N candidate DRX start offset patterns, respectively corresponding to different DRX start offsets, wherein N is an integer greater than or equal to 1;
     an active sequence of the N candidate DRX start offset patterns, or
     duration of the N candidate DRX start offset patterns.

2. The method according to claim 1, wherein when the DRX start offset information is obtained by receiving the first DCI, the DRX start offset information comprises T DRX start offset indications, the DRX start offset indication comprises an effective delay of the DRX start offset indication and at least one of W target DRX start offsets, and T and W are integers greater than or equal to 1.

3. The method according to claim 2, wherein the W target DRX start offsets take effect after the effective delay of the DRX start offset indication has lapsed since a first moment,
   wherein the first moment is an end moment of receiving the last symbol of a first PDCCH carrying the first DCI, the effective delay of the DRX start offset indication has M time units, and M is an integer greater than or equal to 0.

4. The method according to claim 2, wherein the DRX start offset indication indicates the W target DRX start offsets by one of the following:
   indicating index values of the W target DRX start offsets;
   indicating index values of W target objects, wherein the W target objects are W target time unit groups in A time unit groups obtained by dividing time units comprised in a DRX cycle into equal parts, and A is an integer greater than or equal to 1; or
   indicating index values of W target bitmaps, wherein each bit comprised in the W target bitmaps represents Y time units in the DRX cycle, and Y is an integer greater than or equal to 1.

5. The method according to claim 2, wherein each target DRX start offset in the W target DRX start offsets respectively corresponds to a different cycle type of DRX, or
   each target DRX start offset in the W target DRX start offsets respectively corresponds to different DRX groups.

6. The method according to claim 2, wherein when the first DCI is a group common DCI, the T DRX start offset indications respectively correspond T users.

7. The method according to claim 1, wherein when the DRX start offset information is obtained based on the configuration of the network side device or the stipulation in the protocol, the DRX start offset information comprises at least one of a default DRX start offset or a default effective delay of a DRX start offset indication.

8. The method according to claim 1, wherein when the DRX start offset information comprises the expected data packet scheduling location, the method further comprises:
   determining a target DRX start offset corresponding to the expected data packet scheduling location, wherein the target DRX start offset meets a first condition; and
   the first condition comprises at least one of the following:
   the expected data packet scheduling location is within duration of a DRX cycle that is associated with the target DRX start offset; or
   the start moment of the DRX cycle that is associated with the target DRX start offset is closest to the expected data packet scheduling location.

9. The method according to claim 1, wherein when the DRX start offset information comprises the expected data packet scheduling location and the N candidate DRX start offset patterns, the method further comprises:
   determining a target DRX start offset pattern corresponding to the expected data packet scheduling location, wherein the target DRX start offset pattern meets a second condition; and
   the second condition comprises at least one of the following:

the expected data packet scheduling location is within duration of a DRX cycle that is associated with the target DRX start offset pattern; or the start moment of the DRX cycle that is associated with the target DRX start offset pattern is closest to the expected data packet scheduling location, wherein the target DRX start offset pattern is any one of the N candidate DRX start offset patterns.

10. The method according to claim 1, wherein the N candidate DRX start offset patterns are determined based on at least one of the following:

a length of a DRX cycle;

DRX duration; or the expected data packet scheduling location.

11. The method according to claim 1, wherein the N candidate DRX start offset patterns are configured by the network side device, and the method comprises one of the following:

activating, based on media access control control element (MAC CE) signaling, Q DRX start offset patterns in the N candidate DRX start offset patterns, and activating, based on a second DCI, R DRX start offset patterns in the Q DRX start offset patterns;

activating, based on the MAC CE signaling, the Q DRX start offset patterns in the N candidate DRX start offset patterns; or activating, based on the second DCI, R DRX start offset patterns in the N candidate DRX start offset patterns.

12. The method of claim 11, wherein the second DCI comprises at least one of the following:

indication information of an active sequence of R candidate DRX start offset patterns; or indication information of duration of the R candidate DRX start offset patterns.

13. The method according to claim 1, wherein before receiving the first DCI, the method further comprises:

reporting second information, wherein the second information is used to indicate whether the terminal device supports configuration of a DRX start offset indication.

14. A method for discontinuous reception (DRX) configuration, performed by a network side device, comprising:

providing, by a first method, DRX start offset information for a terminal device, wherein the DRX start offset information is used to determine a target DRX start offset;

wherein the first method includes at least one of the following:

sending first downlink control information (DCI), wherein the first DCI carries the DRX start offset information;

configuring the DRX start offset information; or sending first information, wherein the first information carries the DRX start offset information, wherein when the DRX start offset information is provided by the first information the DRX start offset information comprises at least one of the following:

an expected data packet scheduling location that is different from a start moment of the DRX cycle that is associated with the target DRX start offset;

N candidate DRX start offset patterns, respectively corresponding to different DRX start offsets, wherein N is an integer greater than or equal to 1;

an active sequence of the N candidate DRX start offset patterns; or duration of the N candidate DRX start offset patterns.

15. A network side device, comprising a memory, a processor, and instructions stored in the memory and executable on the processor, wherein when the instructions are executed by the processor, steps of the method according to claim 14 are implemented.

16. A terminal device, comprising:

a memory storing a computer program; and a processor coupled to the memory and configured to execute the computer program to perform operations comprising:

obtaining discontinuous reception (DRX) start offset information by a first method; and determining a target DRX start offset based on the DRX start offset information, wherein the first method includes at least one of the following:

receiving first downlink control information (DCI), wherein the first DCI carries the DRX start offset information;

configuring the DRX start offset information by a network side device or stipulating the DRX start offset information in a protocol; or obtaining first information, wherein the first information carries the DRX start offset information, wherein when the DRX start offset information is obtained by obtaining the first information, the DRX start offset information comprises at least one of the following:

an expected data packet scheduling location that is different from a start moment of the DRX cycle that is associated with the target DRX start offset;

N candidate DRX start offset patterns, respectively corresponding to different DRX start offsets, wherein N is an integer greater than or equal to 1:

an active sequence of the N candidate DRX start offset patterns; or duration of the N candidate DRX start offset patterns.

17. The terminal device according to claim 16, wherein when the DRX start offset information is obtained by receiving the first DCI, the DRX start offset information comprises T DRX start offset indications, the DRX start offset indication comprises an effective delay of the DRX start offset indication and at least one of W target DRX start offsets, and T and W are integers greater than or equal to 1.

18. The terminal device according to claim 16, wherein when the DRX start offset information is obtained based on the configuration of the network side device or the stipulation in the protocol, the DRX start offset information comprises at least one of a default DRX start offset or a default effective delay of a DRX start offset indication.

* * * * *